No. 646,206. Patented Mar. 27, 1900.
N. DU BRUL.
CIGAR WRAPPER CUTTING MACHINE.
(Application filed Dec. 8, 1899.)
(No Model.)
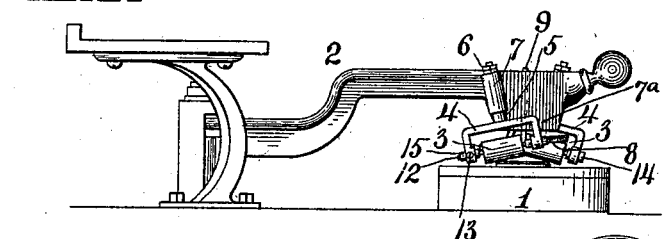
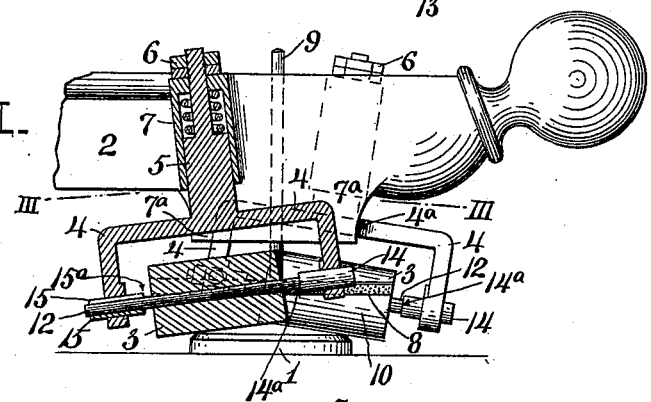
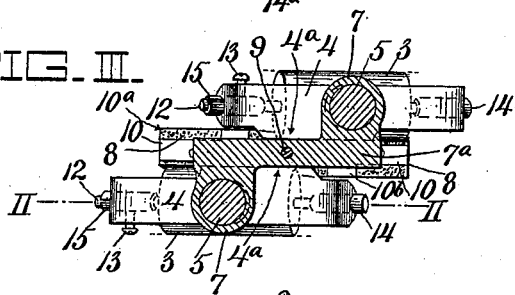
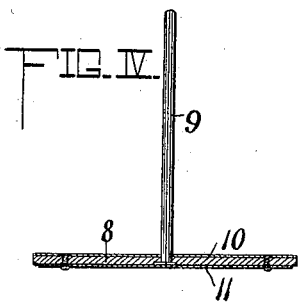
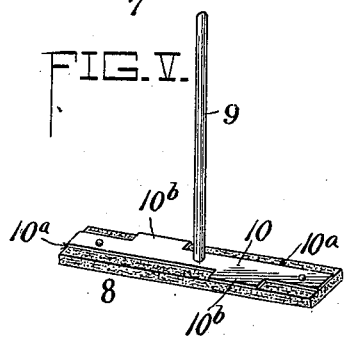
Witnesses
W. E. Allen
Walter Allen
Inventor
Napoleon Du Brul.
By Knight Bros
Attorneys

UNITED STATES PATENT OFFICE.

NAPOLEON DU BRUL, OF CINCINNATI, OHIO.

CIGAR-WRAPPER-CUTTING MACHINE.

SPECIFICATION forming part of Letters Patent No. 646,206, dated March 27, 1900.

Application filed December 8, 1899. Serial No. 739,700. (No model.)

*To all whom it may concern:*

Be it known that I, NAPOLEON DU BRUL, a citizen of the United States, and a resident of Cincinnati, in the county of Hamilton and State of Ohio, have invented certain new and useful Improvements in Cigar-Wrapper-Cutting Machines, of which the following is a specification.

My invention relates to those cigar-wrapper-cutting machines which employ a cutting-die giving shape or form to the cigar-wrapper and an arm carrying rollers adapted to be swung so as to sweep across the cutting-die and to coöperate therewith to perform the cutting operation.

My present invention has for its object to improve the construction of such a machine, whereby it is better adapted to perform its function; and it consists in novel features of construction to be hereinafter fully described, and particularly pointed out in the claims.

My improved machine employs a suitable die, an arm swinging in a plane above said die and carrying specially-arranged rollers coöperating with the die to cut the leaf, and a specially-arranged gravity-wiper in such relation to the cutter-rollers that it will rest upon the rollers and automatically keep their surfaces clear of adhering particles, which sometimes prevent obtaining a clean cut of the leaf. The rollers are mounted on their axles so that they may move axially thereon during the cutting operation and present constantly-changing portions of their surfaces to the cutting edge, and thus prevent unequal wear in the surface of either roller. The rollers are furthermore inclined so that their inner ends are raised slightly from the platen within the cutting-die, and contact with the leaf upon said platen is avoided as the rollers slide back and forth on their axles. A special advantage arises from combining the two last-named features—namely, the axially-movable rollers and the inclined position thereof—in that by avoiding contact with the portion of the leaf within the cutting-die and causing the rollers to contact with only the edges of the cutting-die the axial shifting of the rollers is free to take place without distorting the leaf.

In order that my invention will be fully understood, I will proceed to describe it with reference to the accompanying drawings, in which—

Figure I is a side elevation of the upper part of a cigar-wrapper-cutting machine provided with my improvements in the swinging member. Fig. II is a detail vertical section thereof, on a larger scale, on the line II II, Fig. III. Fig. III is a detail horizontal section of the same on the line III III, Fig. II. Fig. IV is a vertical longitudinal section of the wiper on a central line. Fig. V is a perspective view thereof.

1 represents the cutting-die, which may be of any suitable construction.

2 is an arm suitably pivoted and adapted to be swung horizontally above the cutting-die. The arm 2 carries cylindrical rollers 3, each mounted in an inclined yoke 4, formed with an inwardly-projecting fin or flange $4^a$ and provided with a spindle 5, supported by jam-nuts 6 and which works in a bearing 7 in the arm 2 in a manner well understood in such machines. The fins or flanges impinge against the central pendent projection $7^a$ of the bearing 7. Mounted between the rollers 3 and resting by gravity upon them is a wiper 8, held against lateral displacement by a vertically-sliding rod 9, loosely fitted in a socket in the arm. The function of this wiper 8 is to rest upon the peripheries of the rollers 3 and remove therefrom any adherent particles of tobacco or other foreign substance, which would otherwise be carried around by the rollers and intervening between the rollers and the cutting edge of the cutting-die would prevent obtaining a clean cut of the cigar-wrapper.

I do not limit myself to any particular construction of the wiper 8, but have illustrated in Figs. IV and V a form which is found to serve my purpose well. This comprises an elongated flat body, which may be of felt, leather, or other suitable substance, and upper and lower attaching-plates 10 and 11, respectively, which receive the sliding guide-rod 9. The upper plate 10 is formed with recesses $10^a$ at the side edges over the rollers, so that the lower side edges of the wiper may rest with a yielding pressure upon the rollers. The projections $10^b$ provide wear-plates to prevent the wiper-body from contacting with the yokes. Each roller is mounted upon an axle 12, secured in its yoke 5 and held in place by means of a set-screw 13. As shown in Figs. I, II, and III, each axle carries an enlargement 14 at one end, provided with a shoulder $14^a$, while at the opposite end the axle is surrounded by a split sleeve 15, which forms a second shoulder $15^a$ on the axle. The rollers 3 are thus adapted to move longitudinally between the shoulders $14^a$ and $15^a$. The distance between these shoulders is readily adjustable by changing the position of the axle 12 and the split sleeve 15. Moreover, by reason of the sleeve 15 being split and clamping upon the sleeve end of the axle under pressure of the set-screw 13 one, set-screw is sufficient to hold the entire axle in place and maintain adjustment of the distance between the shoulders $14^a$ and $15^a$.

In order to prevent contact between the rollers 3 and the portion of the leaf within the cutting-die which forms the cigar-wrapper, each roller is inclined from its inner end outward, (see Figs. I and II,) and as the rollers are mounted upon inclined axes their peripheries incline upward toward their inner ends, and thus do not come in contact with anything but the edge of the cutting-die. By having the rollers moving axially they are shifted upon their axes as the arm is swung from side to side by reason of the inclination of the cutting edge to the direction in which the rollers travel. Were it not for the elevation of the inner ends of the rollers this axial movement would tend to crowd the leaf as the rollers shifted on their axles.

Having thus described my invention, the following is what I claim as new therein and desire to secure by Letters Patent:

1. A cigar-wrapper-cutting machine comprising an arm having a bearing, a roller having a yoke supported from the bearing, and a horizontal elongated wiper, having a lower side edge adapted to rest upon the periphery of the roller, and provided with a loose sliding connection with the arm; substantially as described.

2. A cigar-wrapper-cutting machine comprising an arm having bearings, a pair of rollers having yokes supported from the bearings, and a horizontal wiper, common to both rollers, having lower side edges adapted to rest upon the peripheries of the rollers and provided with a loose sliding connection with the arm between the bearings; substantially as described.

3. A cigar-wrapper-cutting machine comprising an arm having bearings, a pair of overlapping rollers having yokes supported from the bearings and a horizontal wiper, common to both rollers, having lower side edges adapted to rest upon the peripheries of the rollers and provided with a rod projecting upwardly from the wiper and loosely fitted in the arm between the bearings; substantially as described.

4. In combination with a pair of cutter-rollers of a cigar-wrapper-cutting machine; a wiper 8 common to both rollers having its lower side edges resting upon the peripheries thereof, and having an upwardly-projecting rod 9 and a socket in the mounting for the rollers located in the vertical dividing-plane between the rollers; substantially as and for the purposes set forth.

5. The herein-described wiper for cigar-wrapper-cutter rollers, consisting of the elongated flat body portion $8^a$ of suitable material, an upper plate 10 and the side recesses $10^a$ and side projections $10^b$ and a lower plate 11, and the upwardly-extending rod 9 adapted for use, substantially in the manner and for the purpose herein set forth.

6. In a cigar-wrapper-cutting machine, a cutting-roller, a mounting for said roller, and an axle by which the roller is secured to the mounting and upon which the roller is moved axially, substantially in the manner and for the purpose set forth.

7. In combination with the cutter-roller for a cigar-wrapper-cutting machine, the axle upon which said roller is mounted, formed with a reduced portion upon which the roller is axially movable, and with a shoulder for limiting the axial movement of the roller, and a sleeve surrounding the reduced portion of the axle and likewise limiting the axial movement of the said roller, substantially in the manner and for the purpose set forth.

8. In a cigar-wrapper-cutting machine, the combination of the cutting-roller, the mounting for said roller, the axle fitted at one end in said mounting and formed with a reduced portion providing a bearing upon which the roller has axial as well as rotary movement, a shoulder for limiting the axial movement in one direction, a sleeve surrounding the reduced end of the axle and fitting in the mounting for the roller, and a set-screw for fixing the position of the sleeve upon the axle and the position of the axle in the mounting; substantially as herein explained.

9. In a cigar-wrapper-cutting machine, cutting-rollers, mountings for said rollers, and axles by which the rollers are secured to the said mountings, and upon which the rollers are moved axially; substantially as described.

10. In a cigar-wrapper-cutting machine, the combination of a cutting-die, and a pair of rollers axially movable on their axles inclined from their inner ends toward their outer ends and which project within the edges of the cutting-dies; substantially as and for the purposes set forth.

NAPOLEON DU BRUL.

Witnesses:
E. H. MOELLMANN,
J. H. FELAT.